United States Patent
Mani et al.

(10) Patent No.: US 10,698,803 B1
(45) Date of Patent: Jun. 30, 2020

(54) COMPUTER CODE TEST SCRIPT GENERATING TOOL USING VISUAL INPUTS

(71) Applicant: Bank of America Corporation, Charlotte, NC (US)

(72) Inventors: Guru Mani, Chennai (IN); Shankarganesh Pragatheeswaran, Chennai (IN); Vinodh Sagayaraj Antoine, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 66 days.

(21) Appl. No.: 16/243,573

(22) Filed: Jan. 9, 2019

(51) Int. Cl.
*G06F 11/36* (2006.01)
*G06N 20/00* (2019.01)
*G06F 3/0484* (2013.01)

(52) U.S. Cl.
CPC ...... *G06F 11/3684* (2013.01); *G06F 11/3664* (2013.01); *G06F 11/3688* (2013.01); *G06N 20/00* (2019.01); *G06F 3/0484* (2013.01)

(58) Field of Classification Search
CPC ............ G06F 11/3684; G06F 11/3664; G06F 11/3688; G06N 20/00
See application file for complete search history.

(56) References Cited

U.S. PATENT DOCUMENTS

| | | | | |
|---|---|---|---|---|
| 6,148,277 A * | 11/2000 | Asava | ................. | G06F 11/3664 379/10.03 |
| 7,272,822 B1 * | 9/2007 | Riggins | ................... | G06F 9/451 717/124 |
| 8,356,282 B1 * | 1/2013 | Leippe | ................ | G06F 11/3664 717/125 |
| 8,381,197 B2 * | 2/2013 | Meenakshisundaram | .................. | G06F 11/3664 717/135 |
| 8,799,866 B2 | 8/2014 | Bullard et al. | | |
| 8,887,135 B2 | 11/2014 | Banerjee et al. | | |

(Continued)

OTHER PUBLICATIONS

Nguyen et al., "GUITAR: an innovative tool for automated testing of Gui-driven software", May 7, 2103, Springer Science+Business Media, pp. 65-105 (Year: 2013).*

(Continued)

*Primary Examiner* — Matthew M Kim
*Assistant Examiner* — Indranil Chowdhury
(74) *Attorney, Agent, or Firm* — Michael A. Springs

(57) ABSTRACT

A tool includes an interface, a memory, a conversion engine, an identifier tool, and a script engine. The interface communicatively couples the tool to a server. The tool obtains a plurality of visual inputs from a computer program specification document. The memory stores the plurality of visual inputs and a set of known computer code elements. Each respective element of the set of known computer code elements includes predetermined testing criteria far testing computer code that includes the respective element. The conversion engine generates a plurality of textual objects from the plurality of visual inputs. The identifier determines whether each respective textual object matches a respective element of the set of known computer code elements. If a match is found, the identifier tool associates the predetermined testing criteria of the respective element to the respective textual object. The script engine generates a test script using the predetermined testing criteria.

20 Claims, 4 Drawing Sheets

(56) References Cited

U.S. PATENT DOCUMENTS

| | | | |
|---|---|---|---|
| 8,954,933 B2 | 2/2015 | Bullard et al. | |
| 8,972,946 B2 | 3/2015 | Bullard et al. | |
| 9,201,572 B2* | 12/2015 | Lyon | G06F 3/0484 |
| 9,753,843 B2 | 9/2017 | Kandpal | |
| 10,613,971 B1* | 4/2020 | Vasikarla | G06F 40/174 |
| 2008/0086627 A1* | 4/2008 | Splaine | G06F 11/3688 |
| | | | 712/227 |
| 2009/0217302 A1* | 8/2009 | Grechanik | G06F 9/45512 |
| | | | 719/320 |
| 2011/0088011 A1* | 4/2011 | Ouali | G06F 8/35 |
| | | | 717/105 |
| 2011/0123973 A1* | 5/2011 | Singh | G06F 11/3668 |
| | | | 434/322 |
| 2011/0145653 A1* | 6/2011 | Broadfoot | G06F 11/3604 |
| | | | 714/38.1 |
| 2014/0089895 A1* | 3/2014 | Clee | G06F 11/3604 |
| | | | 717/121 |
| 2014/0331212 A1* | 11/2014 | Gaikwad | G06F 11/3684 |
| | | | 717/131 |
| 2015/0347281 A1* | 12/2015 | Arkadyev | G06F 11/3688 |
| | | | 717/124 |
| 2018/0260310 A1* | 9/2018 | Vorganti | G06F 11/3684 |

OTHER PUBLICATIONS

Utting et al., "A Taxonomy of Model-Based Testing", Apr. 2006, Working Paper:Apr. 2006, Dept. of Computer Science, University of Waikato, pp. 1-18 (Year: 2006).*

* cited by examiner

COMPUTER CODE TEST SCRIPT GENERATING TOOL USING VISUAL INPUTS

TECHNICAL FIELD

The present disclosure relates generally to testing computer code, and more specifically to generating test scripts for testing computer code.

BACKGROUND

One of the technical challenges associated with testing or debugging computer code is writing accurate test scripts that cheek computer programs for adherence to design specifications, Existing solutions typically require the completion of a developed computer program before a test script may be generated. Furthermore, conventional techniques also require the correlation of the developed computer program code to the design specifications for the computer program. Accordingly, current solutions typically require additional computer processing and memory resources associated with writing additional test scripts and checking the written test scripts for compliance with subsequent versions of the computer program, these additional resources may be expended even if the subsequent version of the developed computer program follows the same design specification. Existing techniques are inadequate and resource intensive. For example, requiring the completed computer program to write the test scripts may introduce errors and inaccuracies from the computer program code into the test scripts, thereby increasing the amount of processing resources used to test the computer code, e.g., by having to run subsequent test scripts that address the incompleteness of the earlier test script. Additionally, inadequate test scripts, such as those that are inaccurate or incomplete, hamstrings the ability to test computer programs, thereby increasing the chance of system crashing bugs and security vulnerabilities to appear in the end-user versions of the computer program code. Each of these issues increases the amount of computer resources used to run the computer program, e.g., by requiring restarting/re-running the program after a crash, by introducing memory leaks when running the program, or allowing, unauthorized programs to run on the system.

SUMMARY

One of the technical challenges associated with testing or debugging computer code is writing accurate test scripts that check computer programs for adherence to design specifications. Current solutions result in unnecessary computer processing and memory resources to be used in the process of generating and using test scripts. For example, test scripts based on the developed computer program code may result in incomplete or inaccurate tests scripts. This may result from the conversion of the design specifications for the computer program to functional requirements and the parsing or interpretation of the developed computer code. This process is prone to errors and may further result in test scripts that are only usable on that particular version of the developed computer program code. For example, subsequent versions of the computer program may use different styles or implementations of the functional elements defined in the specification document. In this case, a new test script may have to be used, requiring additional processing resources to generate the test script, run the test script against the new version, and maintain the correlation between the test scripts and the applicable program versions. With a limited amount of resources available, the factors described above may result in substandard code testing and lead to a higher chance for the development of non-functioning or insecure computer programs as well as a slower development-testing cycle.

The systems and methods described herein provide several technical advantages that ensure complete and efficient testing of computer code. In particular, a test script generating tool is provided that generates test scripts based on visual inputs from a computer program specification document. The test script generating tool allows for the generation of test scripts even before the computer code is written. This provides immediate feedback on his computer code once it is checked into the completed computer code repository, thereby decreasing the time before bugs or compliance issues are addressed, thereby limiting the wasted resources associated with running buggy or non-compliant computer code. As another example, in certain embodiments, the test script generating tool incorporates one or more machine learning techniques to identify elements from the visual inputs of the computer program specification document. In certain embodiments, the test script generating tool uses Bayesian analysis to determine the type and characteristics of an element in the visual input. Further, in some embodiments, the test script generating tool uses keyword-based sentimental classification to identify an element in the visual input based on text identified from the visual input. The identified elements may be used by the test script generating tool to generate a test script to test those elements and associated functions and enhance the detection techniques utilizing machine learning. In this manner, a trained test script generating tool may generate accurate test scripts while limiting the amount of resources used to obtaining external information.

Another challenge in testing computer program code is the lack of flexibility in testing the computer code. As mentioned above, typical solutions require to the identification of the elements of the developed computer program code to be tested and interpreting how to apply the design constraints and requirements from the specification document, As a result, the generated test scripts may only apply to the specific version of the developed computer program code used, in generating the test script. Certain systems and methods disclosed herein allow for fine-tuning of the test script using the test script generating tool, For example, in certain embodiments, the test script generating tool may be communicatively coupled to a user interface, through which a user may customize the test script, e.g., by selecting certain identified functions or elements to test or not test. Based on this user input, the test script generating tool may generate a test script that is tailored for the testing desired for the computer program. Furthermore, user input may be used by the test script generating tool to enhance its machine learning engines. For example, the user may add additional contextual information through with which the test script generating tool may identify the elements based on the visual inputs from the computer code specifications document.

Certain embodiments of the present disclosure may include some, all, or none of these advantages. These advantages and other features will be more clearly understood from the following detailed description taken in conjunction with the accompanying drawings and claims.

According to an embodiment, a test script generating tool is provided for generating a test script for use in an automation framework, The test script generating tool includes an interface, a memory, a conversion engine, an identifier tool, and a script engine. The interface communicatively couples the test script generating tool to a server. The test script generating tool accesses the server via the interface to obtain a plurality of visual inputs from a computer program specification document. Each visual input represents one or more functional requirements of the computer program specification document. The memory stores the plurality of visual inputs and a set of known computer code elements. Each respective element of the set of known computer code elements includes predetermined testing criteria for testing computer code that includes the respective element. The conversion engine accesses the plurality of visual inputs from the memory. The conversion engine further generates a plurality of textual objects from the plurality of visual inputs using one or more processors. The plurality of textual objects is associated with the one or more functional requirements of the computer program specification document. The identifier tool accesses the set of known computer code elements from the memory. The identifier tool further compares the plurality of textual objects to the set of known computer code elements to determine, for each respective textual object of the plurality of textual objects, whether the respective textual object matches a respective element of the set of known computer code elements. If the respective textual object matches a respective element of the set of known computer code elements, the identifier tool associates the predetermined testing criteria of the respective element to the respective textual object. The script engine generates a test script using the predetermined testing criteria associated with the plurality of the textual objects. The script engine further transmits the test script to a test script repository server. The automation framework may access the test script from the test script repository server.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

The systems and methods disclosed herein provide several technical advantages in testing computer programs. Generating test scripts based on visual inputs from a computer program specification document is an unconventional technique that allows test scripts to be generated before a developer finishes a completed version of the computer program according to the specification document. Existing techniques conventionally require a test script writer to write a test script based on the completed computer program and his understanding of the specification document. Generating test scripts using a test script generating tool using visual inputs from the specification document requires may produce more robust, e.g., complete, and accurate test scripts that save processing resources by catching a high percentage of bugs in the computer programs before sent to end-users. Furthermore, the disclosed techniques may also shorten development-testing cycle, thereby reducing the amount of computer resources used in stopping and starting development due to delays in writing and running test scripts.

Figure 1:
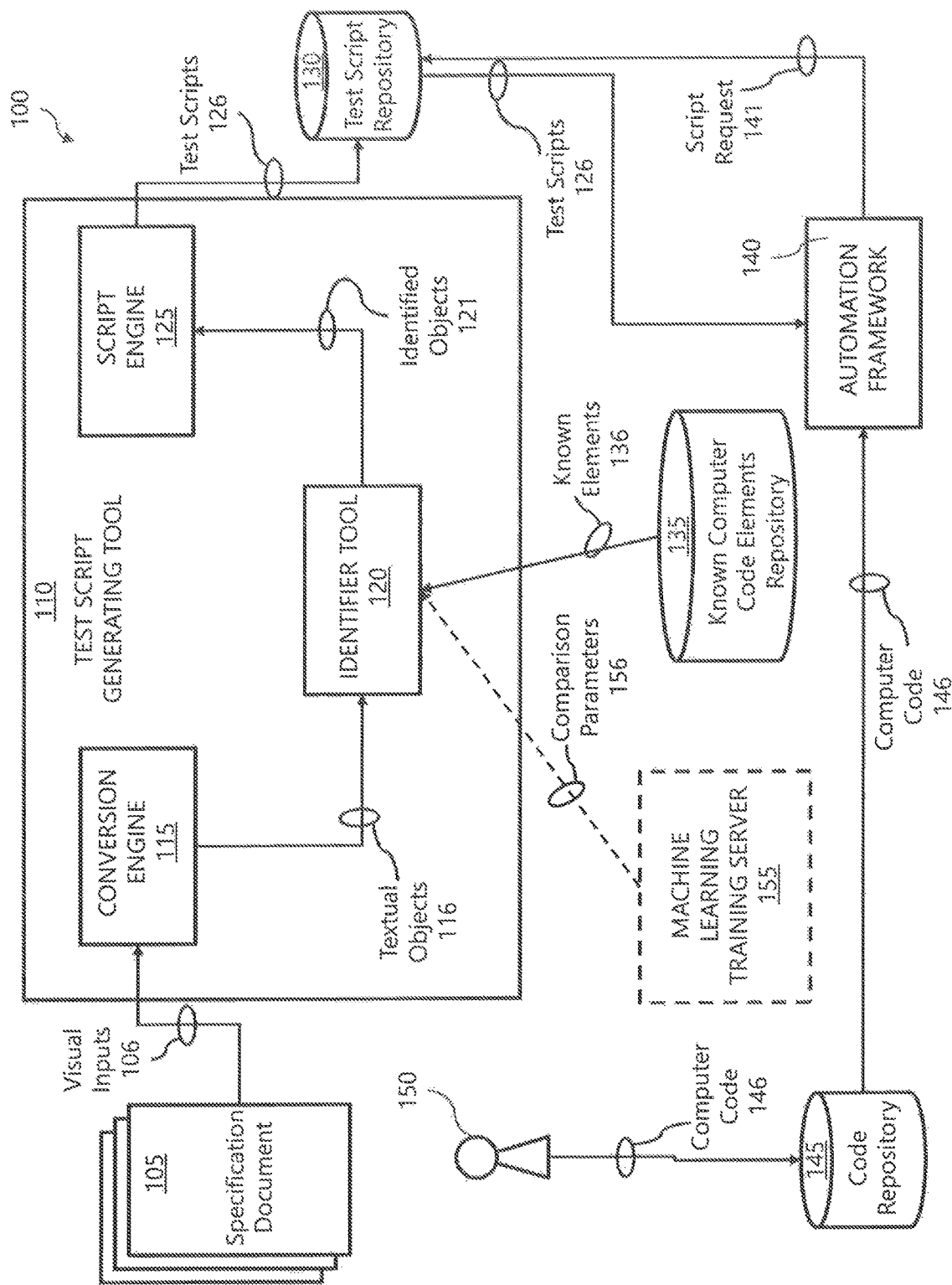
FIG. 1 is a schematic diagram of an embodiment of a code testing system for generating test scripts and testing computer programs using the generated test scripts, according to particular embodiments.
Figure 2:
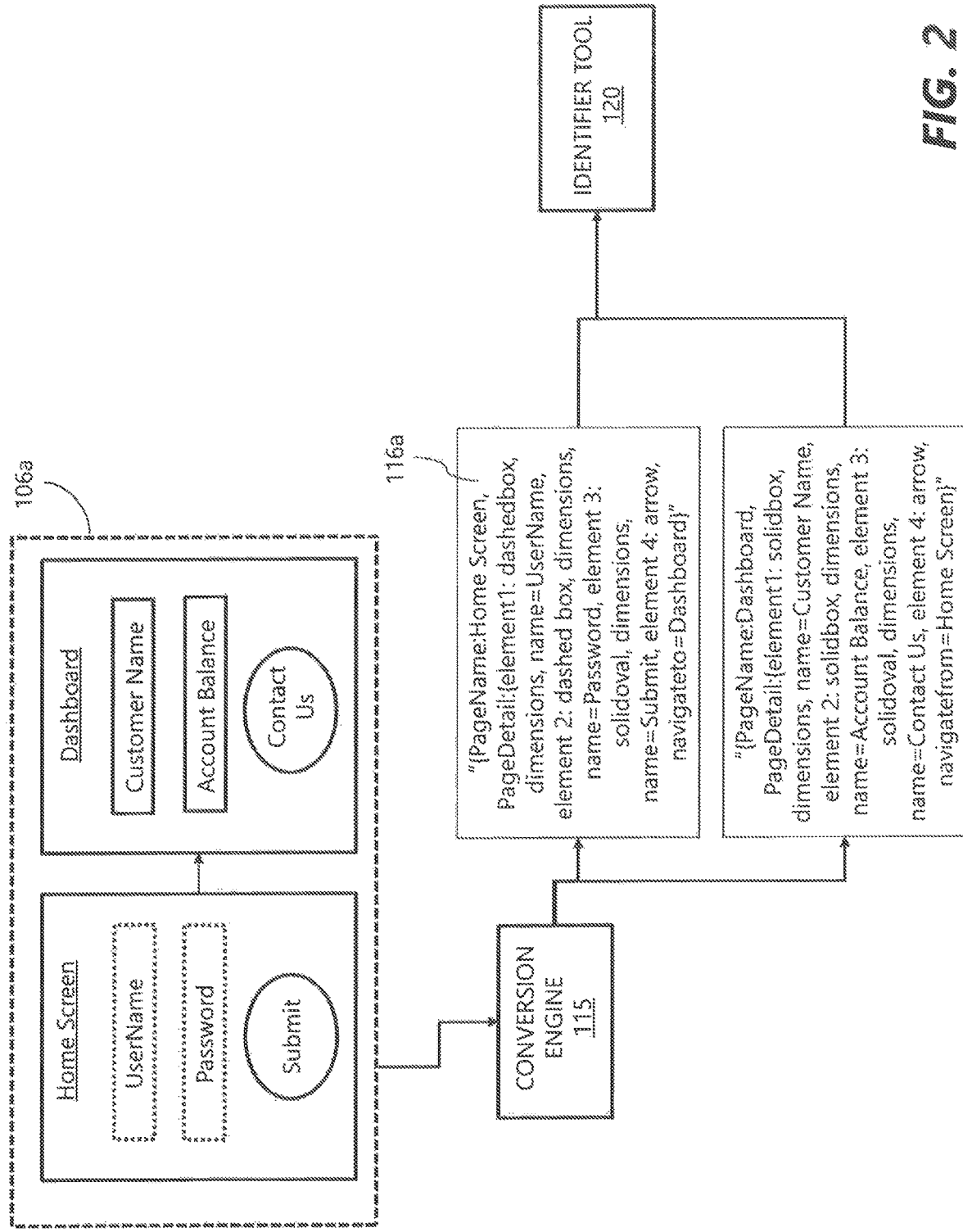
FIG. 2 illustrates example visual input and textual objects used in generating a test script, according to particular embodiments.
Figure 3:
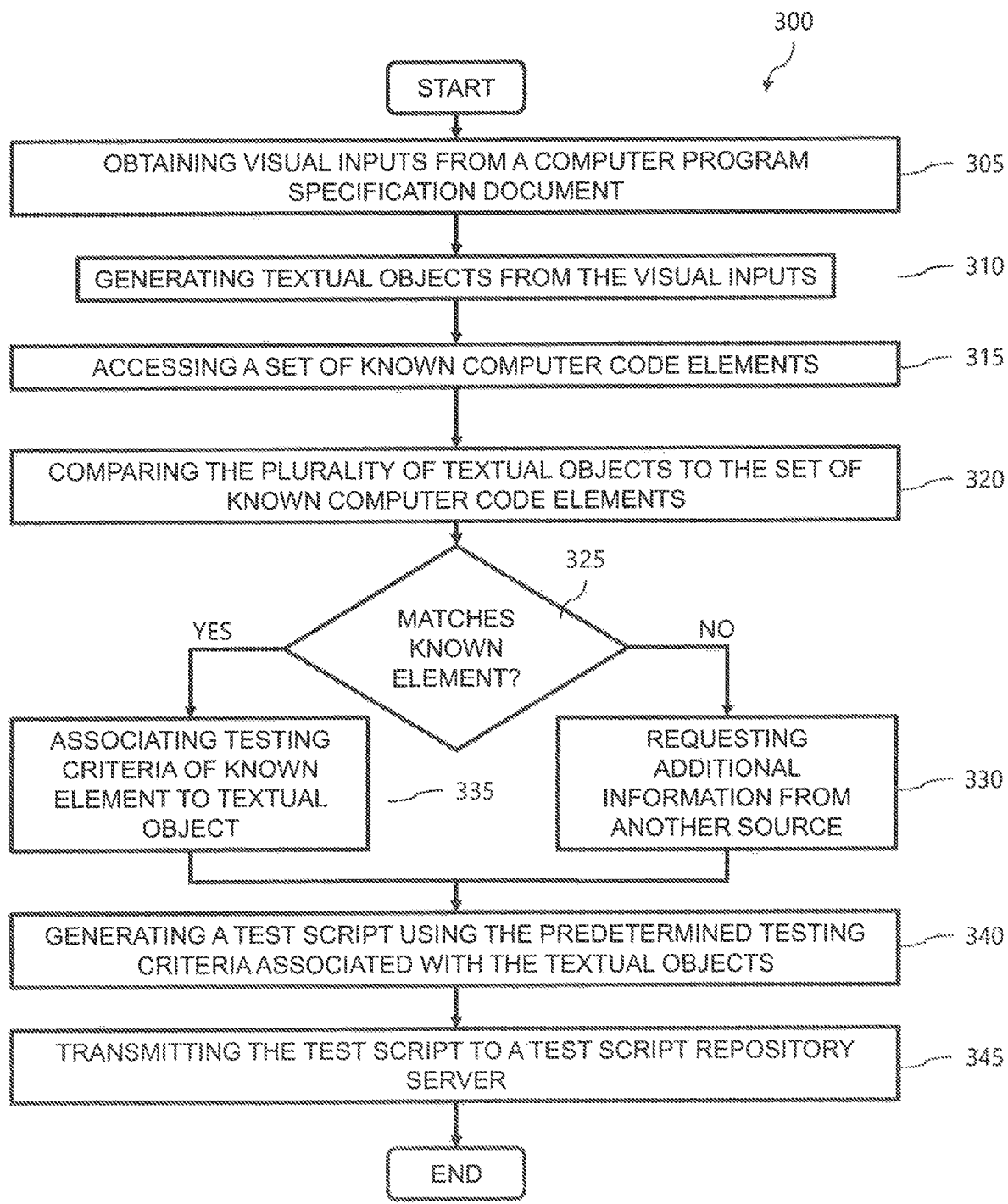
FIG. 3 is a flowchart of an embodiment of an example method for generating a test script, according to particular embodiments.
Figure 4:
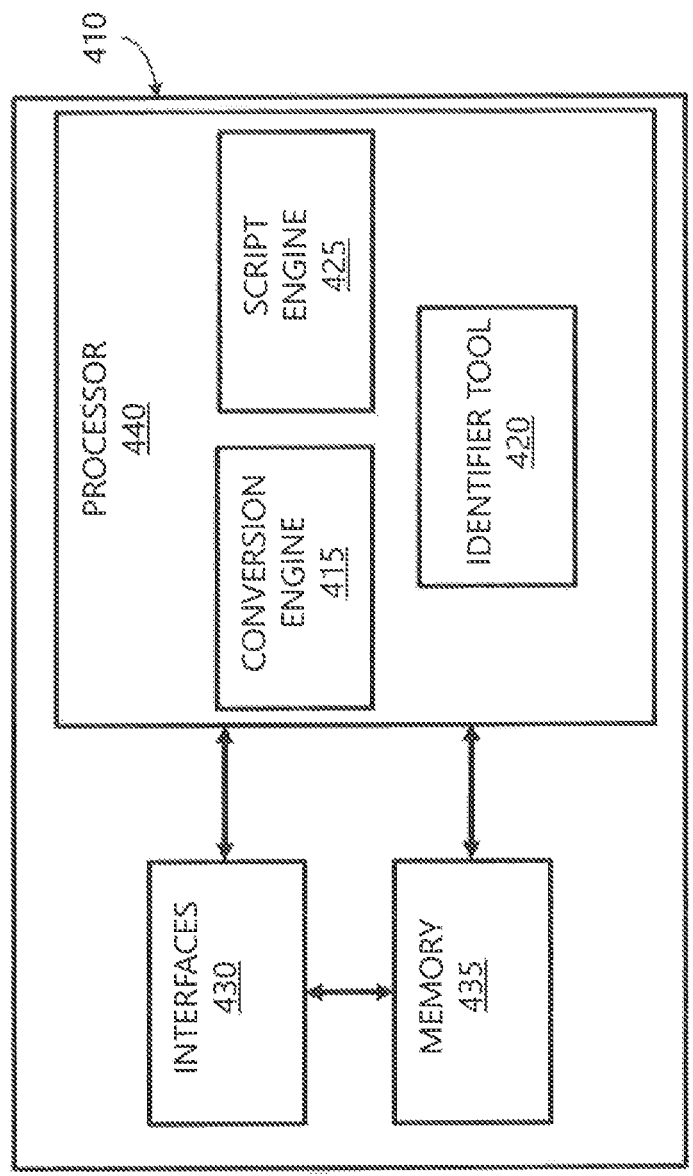
FIG. 4 is a schematic diagram of an example test script generating tool for generating test scripts using visual inputs, according to particular embodiments.

FIG. 1 shows an example of a code testing system for generating test scripts using visual inputs and testing computer programs. FIG. 2 illustrates example visual inputs and example resulting textual objects that may be used by a script generating tool. FIG. 3 is an example process for generating a test script using visual inputs. FIG. 4 is an example of an implementation of a test script generating tool for generating test scripts.

FIG. 1 is a schematic. diagram of an example embodiment of code testing system 100. System 100 may be configured to take visual inputs 106 from a specification document 105, generate one or more test scripts 126 using a test script generating tool 110, and use generated test script(s) 126 with an automation framework 140 to test computer program code 146 developed using specification document 105. In certain embodiments, code testing system 100 includes at least test script generating tool 110, a test script repository 130 and an automation framework 140, and a code repository 145. Specification document 105 may be parsed or otherwise processed to generate visual inputs 106. Visual inputs 106 from specification document 105 may indicate the functional or other requirements of the computer program to be developed based on specification document 105. For example, visual inputs 106 may include portions of a flow diagram describing how to implement functional blocks of the computer program or certain style or user design specifications. As a result, visual inputs 106 may represent the functional requirements of the computer program code to be developed based on specification document.

In system 100, visual inputs 106 from specification document 105 may be transmitted to or otherwise obtained by test script generating tool 110. Test script generating tool 110 may use visual inputs 106 to generate a test script that may be used to test computer programs developed using specification document 105. In certain embodiments, test script generating tool 110 includes conversion engine 115, identifier tool 120, and script engine 125. Test script generating tool 110 may use conversion engine 115 to convert each of visual inputs 106 into textual objects 116, which are text-based objects that encode the functional elements represented by visual inputs 106 into a more-easily handled form. A non-limiting example of such a conversion is detailed below with reference to FIG. 2. Test script generating tool 110 may then use textual objects 116 with identifier tool 120 to identify the properties of textual objects 116 and whether they match with known computer code elements 136. For example, identifier tool 120 may compare textual objects 116 with known computer code elements 136 and based on the comparison, associate certain testing criteria to textual objects 116, e.g., to test for the ability to receive a certain input or to test that the navigation goes to the correct destination. Then, test script generating tool 110 may use script engine 125 to generate test script 126. For example, script engine 125 may compile the testing criteria of textual objects 116 into a series of tests to run as a script, As a result, system 100 may use test script generating tool 110 to generate test script 126 from visual inputs 106 from specification document 105.

System 100 may then further test computer programs, such as computer code 146, using the generated test scripts from test script generating tool 110. The generated test scripts, such as test script 126, may be stored in memory or storage, such as test code repository server 130. These tests scripts may be accessed by automation framework 140 upon request, e.g., a script request 141. Automation framework 140 may be configured to receive a computer program 146, e.g., from computer code repository server 145, and run test script 126 or any other suitable test procedures on computer program code 146. In certain embodiments, a developer 150 may upload a computer program developed based on specification document 105. Automation framework 140 may retrieve the computer program code 146 from computer code repository server 145 and test scripts relevant to specification document 105 from test script repository server 130. Automation framework 140 may then run test script 126 against the computer program code 146 and provide feedback, e.g., in a report, indicating any errors corrections needed in the computer program code 146. In summary, system 100 generates a test script using test script generating tool 110 using visual inputs 106 from specification document 105 and tests a developed computer program based on specification document 105 with automation framework 140 using the generated test script.

Specification document 105 used in system 100 may suitably describe the functional and other requirements used by developers to write the computer code. The development of a computer program or a portion of a computer program may begin with the drafting of a specification document 105. Specification document 105 may include a description of the desired functionality of the computer program to be developed. Specification document 105 may include high-level or abstract depictions of various elements of the computer program. For example, specification document 105 may include pictorial or visual elements that correspond to particular functional requirements and/or characteristics to be included in the computer program. Specification document 105 may also include text that describes the functional requirements, e.g., through labels/descriptors of illustrated features or more explicitly in sentences describing that portion of the computer program. Specification document 105 may be any document that can be represented and displayed as visual information. For example, specification document 105 may be a WireFrame document, a Control flow diagram, a Business Requirements Document (BRD), a UX diagram, a Unified Modeling Language (UML document), etc. Specification document 105 may also be a pdf or other "flat" document from which visual information may be extracted. Accordingly, computer programmer or developer may use specification document 105 or portions thereof as the guidelines for writing computer code.

On the other hand, specification document 105 may also be useful in checking whether the developed computer program code, e.g., computer code 146, complies with priorities and requirements of development project. For example, a test script may be written that checks whether certain functional elements described in specification document 105 are included in computer code 146. More specifically, if specification document 105 depicts a flow diagram showing a decision based on inputted information, a test script can include a test whether the code includes such a decision and if it uses that inputted information, As another example, certain user experience styles may be designated by specification document 105. In such cases, test script 126 may include tests whether code elements comply with one or more style templates for displayed elements. As described in further detail below, disclosed herein are certain embodiments of systems and methods that utilize the visual information of specification document 105 to generate test scripts automatically.

According to certain embodiments, test script generating tool 110 may obtain visual inputs 106 from specification document and generate a test script using visual inputs 106. For example, test script generating tool 110 may include an interface communicatively coupling test script generating tool 110 to a server or any other location where visual inputs 106 are stored. Each of visual inputs 106 obtained by test script generating tool 110 may represent one or more functional requirements of specification document 105. For example, one of visual inputs 106 may indicate the inclusion of a button that navigates a user to a particular display screen that displays specified information in a box according to a style template. A respective one of visual inputs 106 may display further information such as describing potential input criteria for user-input textbox or what function or functions are called to cause the display of requested information. The level of detail and specificity may vary based on specification document 105 and/or how visual inputs 106 are obtained from specification document. For example, different file types may encode information differently such that different visual input is obtained. As another example, different parsing or protocols may result in the loss of metadata or other information when obtaining the visual data. In this manner, test script generating tool 110 may obtain visual inputs 106 from specification document 105.

In addition to storing visual inputs 106 in memory, Test script generating tool 110 may store a set of known computer code elements, such as known computer code elements 136, in the memory. The set of known computer code elements may include a set of computer code elements that have known characteristics. For example, a respective known computer code element of known computer code elements 136 could be a text box with a first defined style, a navigation button with a second defined style, a display box with the first defined style, etc. Each of the known computer code elements 136 may have associated with it predetermined testing criteria for testing computer code that includes that element. For example, a text box with a first defined style may be associated with testing criteria such as to test the height and width of the displayed text box, the input text allowed, the number of characters it accepts, and how it displays the text when being inputted. In certain embodiments, the first defined style is associated with a style template, which includes additional or alternative testing criteria to check of the element conforms to the style template. This may include testing for compliance with a color scheme or how element is formatted and displayed to a user. Thereby, test script generating tool 110 may have access to known elements 136 to which textual objects 116 generated from visual inputs 106 may be compared.

Test script generating tool 110 need not store all known computer code elements 136 at all times. In certain embodiments, known computer code elements 136 may be accessed from known computer code elements repository 135 or any other suitable storage location and loaded into the memory of test script generating tool 110. For example, test script generating tool 110 may request known elements 136 from known computer code elements repository 135 in response to receive a request to generate a test script. In some embodiments, the set of known computer code elements 136 requested may depend on specification document 105. For example, specification document 105 may indicate the category of the computer program that is being developed and/or what libraries may be used in developing the computer program. In this case, test script generating tool 110 may only request known computer code elements 136 that would be relevant to generating test script 126 based on specification document 105. In some embodiments, the set of known computer code elements 136 may change over time, e.g., via updates to libraries, styles, etc. Accordingly, test script generating tool 110 may periodically or upon command update the set of known computer code elements 136 it stores in memory. In some embodiments, test script generating tool 110 stores the most common sets of known computer code elements 136 in memory across multiple specification documents, thereby reducing the data usage to/from known computer code elements repository 135. In sum, test script generating tool 110 may have access to relevant and complete sets of known computer code elements 136, which are used in generating test script 126, as further detailed below.

Conversion engine 115 of test script generating tool 110 uses the plurality of visual inputs 106 to generate corresponding textual objects 116. In certain embodiments, conversion engine 115 accesses the plurality of visual inputs 106 from memory and generates a plurality of textual objects 116 from the plurality of visual inputs 106 using one or more processors. Converting visual inputs 106 to textual objects 116 may include identifying pictorial elements by classifications (e.g., a shape type, a control type, dimensions, textual descriptors, etc.) and rendering those classifications into a respective one of textual objects 116, such as a string or other text-based data structure. Conversion engine 115 is configured to maintain the association of functional requirements of the computer program specification document, e.g., specification document 105, during the conversion of visual inputs 106 and generation of textual objects 116. In this manner, conversion engine 115 may convert visual inputs 106 into textual objects that represent the requirements of specification document 105. Textual objects 116 may be more easily handled by test script generating tool 110 in identifying the elements represented by textual objects 116 and generating test script 126, as described further below. As a result, test script generating tool 110 may use conversion engine 115 to provide more-easily-handled textual objects 116 for further use in generating test script 126 while still maintaining the association with the requirements specified in specification document 105.

Conversion engine 105 may handle a variety of types of visual inputs 106 and generate different types of textual objects 116. For example, while visual inputs 106 correspond to textual objects 116 generated by conversion engine 115, the mapping between the visual inputs 106 and textual objects 116 may not be one-to-one. In certain embodiments, conversion engine 115 generates one of textual objects 116 for an individual one of visual inputs 106, but in other embodiments, conversion engine 115 generates more multiple textual objects 116 for an individual one of visual inputs 106. In some embodiments, the number of textual objects 116 generated from an individual one of visual inputs 106 may depend on the characteristics of the respective visual input, such as how the respective visual input is delineated from the other ones of visual inputs 106 and in what file type visual inputs 106 are provided. In this manner, conversion engine 115 may break up visual inputs 105 into more discrete textual objects 116, which are more easily processed by test script generating tool 110. Accordingly, conversion engine 105 may flexibly process visual inputs 106 to generate textual objects 116 that can be used by other aspects of test script generating tool 110 to generate a test script.

Test script generating tool 110 may use identifier tool 120 to identify a matching computer code element for each of textual objects 116. For example, identifier tool 120 may access the set of known computer code elements 136 and compare each of textual objects 116 to the set of known elements 136. In doing so, identifier tool 120 may determine whether the respective one of textual objects 116 matches a respective known element of known elements 136. Identifier tool 120 may make the comparison between the respective one of textual objects 116 and the set of known elements 136 by checking if the characteristics of a respective known element 136 are present in the respective one of textual objects 116. For example, conversion engine 115 may be configured to convert a respective one of visual inputs 106 into textual objects 116 with a certain format that matches the format of the elements in the set of known computer code elements 136, thereby facilitating the comparison to determine if there is a match far the respective one of textual elements 116. In some embodiments, a match is determined if a set of necessary characteristics are shared between the respective one of textual objects 116 and the matching known element of known elements 136. For example, the respective one of textual objects 116 may include additional characteristics that are not relevant to testing the computer program. Accordingly, a known computer code element of the known elements 136 may not include the additional characteristics but would still be a desired match because the respective textual object matches all other characteristics. In some embodiments, the respective textual object must have present all of the characteristics of the respective known computer code element 136 to be determined a match. As a result, identifier tool 120 may identify, for each of textual objects 116, a match to a known computer code element of the known elements 136, the fact of which may be further used in determining what testing criteria to consider for generated test script 126.

While the comparison described above may be suitable for many applications, it may be necessary to include more advanced techniques for identifying the respective one of textual objects 116. In certain embodiments, a simple comparison does not yield a match for the respective textual element. In some cases, this is due to the respective textual object missing or having unknown a key characteristic for identifying the respective textual object and what is a corresponding one of the known computer code elements 136. The missing or unknown characteristic may be due to any number of causes, such as a lack of specificity based on the specification document or having certain characteristics defined in separate visual inputs 106.

In certain embodiments, identifier tool 120 may employ additional comparison techniques to resolve the missing or unknown aspects of the respective one of textual objects 116. In some embodiments, identifier tool 120 may use a Bayesian comparison to determine a matching element of known computer code elements 136. For example, the Bayesian comparison may be trained using machine learning using training sets based on the set of known computer code elements 136. During the Bayesian comparison, identifier tool 120 may the determine the missing attribute of the respective textual element and based on that determination, compare the respective textual element to known elements 136 with the added attribute. In some embodiments, the Bayesian comparison only determines a missing attribute and/or a match with a respective one of known elements 136 if the Bayesian comparison exceeds a match threshold. For example, a threshold of a 90% probability may be set before the Bayesian comparison provides a determination of a missing attribute or a match. In this manner, if there is uncertainty exceeding 10% probability, then the Bayesian comparison may return no match. The thresholds may be determined by a user of script generating tool 110 based on an accuracy tolerance of the computer code or end-user or accuracy of the Bayesian comparison based on its training and prior success rate. In this manner, identifier tool 120 may use a Bayesian comparison to more accurately identify a matching one of known elements 136, even if the respective textual object is missing information used to determine a match.

In addition to determining whether certain characteristics match or are present in the respective one of textual object 116, identifier tool 120 may also compare the constituent text of the respective textual object with text of known computer code elements 136. In certain embodiments, identifier tool 120 may use a keyword-based sentimental classification to determine a matching element of known computer code elements 136. For example, if the respective textual object is missing a control type attribute, e.g., button, text box, display text, etc., it may not match with any of known computer code elements 136. However, the respective textual object may include text that contextually describes its control type. For example, if the respective textual element includes the text "accepts 120 characters for password" the keyword classification may associate the words "accepts 120 characters" with the control attribute of "text box." Based on the keyword classification, identifier tool 120 may associate the determined attribute with the respective textual object and make the comparison to the set of known computer code elements 136. Now, with the added attribute, identifier tool 120 may find a match to a particular text box element. In this manner, keywork-based sentimental classification may be used by identifier tool 120 in comparing textual objects 116 to the set of known computer code elements 136.

Identifier tool 120 may use any suitable combination of comparison and identification techniques. In certain embodiments, identifier tool 120 is configured to use both the Bayesian comparison and the keyword classification. In some embodiments, identifier tool 120 employs the Bayesian comparison before employing the keyword classification. In some embodiments, identifier tool 120 employs the Bayesian comparison after employing the keyword classification. In some embodiments, identifier tool 120 uses the Bayesian comparison only if the keyword classification fails in finding a match between a respective one of textual objects 116 and a respective one of known elements 136. In some embodiments, identifier tool 120 uses the keyword classification only if the Bayesian comparison fails in finding a match between the respective textual object and one of known elements 136. In this manner, the comparison techniques describe above may be combined in a number of different ways to cause identifier tool 120 to most successfully find a match for the respective textual element.

Identifier tool 120 may also be used by test script generating tool 110 to determine what tests to include in the generated test script. For example, if identifier tool 120 determines a match for a respective one of textual object 116, it may assign testing criteria associated with the match to the respective textual object. In certain embodiments, if the respective textual object matches one of known elements 136, identifier 120 associates the predetermined testing criteria of the respective one of known elements 136 to the respective textual object. As discussed above, each of known elements 136 may have testing criteria on which the function of the element may be tested. If the respective textual object is a match, then identifier tool 120 associates the criteria of the matching known element of the known elements 136 to the respective textual object. Identifier tool 120 may repeat this process for each of textual objects 116 generated based on specification document 105. In this manner, identifier tool 120 identifies what testing criteria may apply to textual objects 116, and thereby test script 126.

The testing criteria may include other compliance considerations, such as the style of the computer code or the style of the resulting user design experience. In certain embodiments, the predetermined testing criteria indicates to apply a style template. For example, a matching known element of the known elements 136 may have a characteristic that indicates a style type or a style template that should be used. In such cases, identifier tool 120 may access the style template and determine any user experience design requirements associated with the style template. As mentioned above, this may include formatting features, color schemes, and the application of certain logos or background graphics. One or more style testing criteria may correspond to the one or more user experience design requirements associated with the style template. Accordingly, identifier tool 120 may associated these style testing criteria to the respective one of textual objects 116. As discussed below, script engine 125 may generate test script 126 using the style testing criteria in addition to any other testing criteria discussed herein. Accordingly, identifier fool 120 may associate all of the relevant testing criteria to textual objects 116 to be used to generate test script 126.

Once the testing criteria have been identified and associated with textual objects 116, identified objects 121 may be sent to script engine 125 to generate a test script. Identified objects 121 may include each textual object 116 and any testing criteria or related information associated with the respective textual object 116. In certain embodiments, script engine 125 is configured to generate a test script using the predetermined testing criteria associated with the plurality of textual objects 116 as represented as identified objects 121. For example, for each testing criteria, script engine 125 may determine which tests indicated in the criteria to apply to computer code corresponding to textual objects 116. Script engine 125 may compile all of the determined tests into a single file or set of instructions. Based on this file or set of instructions, script engine 125 may generate test script 126. For example, script engine 125 may generate a json message comprising test script 126 for use at automation framework 140. In some embodiments, the generated test script may be generated in a generic syntax that may be converted for use across a variety of different automation frameworks. As a result, test script generating tool 110 may use script engine 125 to generate a usable test script to test the computer code developed based on specification 105.

Test script generating tool 110 may make test script 126 available for use by other components of system 100, such as automation framework 140. Once test script 126 is generated, script engine 125 may transmit test script 126 to another storage location such as test script repository server 130. The storage location may be accessible by automation framework 140. In some embodiments, the transmitted test script also includes identifying information that allows automation framework 140 to identify from which specification document test script 126 was generated. In this manner, when automation framework 140 is instructed to test a written computer program based on specification document 105, it may retrieve test script 126 generated by test script generating tool 110 using visual inputs 106 from specification document 105.

System 100 may cause the generation of test script 126 by tests script generating tool 110 based on specification document 105 before computer program 146 is developed based on specification document 105. For example, in certain embodiments, test script generating tool 110 generates test script 126 and transmits it test script repository server 130 before computer program 146 is written and/or is available for testing or review. As described above, by using visual inputs 106 of specification document 105, test script generating tool 110 may generate test script 126. Not only does this enable immediate testing once the computer program 146 is written, since test scripts 126 are ready to be accessed and run by automation framework 140 once computer program 146 is uploaded to test code repository 145, it may also provide test scripts that are usable with various versions of computer program 146 if based on the same specification document 105. In this manner, system 100 may provide an improved testing system by providing the generation of test scripts before the computer program is developed.

System 100 may be configured to allow a user to interact with one or more components of system 100 to improve and/or provide flexibility to the generation of test scripts. In certain embodiments, test script generating tool 110 prompting a user via a user interface for an identification of a respective one of textual objects 116. For example, if identifier tool 120 cannot determine a match for the respective textual object using all available methods, it may request user input to specify any missing attributes or identifying a matching element. Once identified, identifying tool 120 may continue with identifying textual objects 116 and associating respective testing criteria, as detailed above. In some embodiments, this user input may be used to train the comparison techniques used by identifier tool 120, thereby continuing to improve the accuracy of the comparison and reduce the amount of user input needed to generate test script 126. In this manner, system 100 may use user input to improve the identification of textual objects 116.

User interaction with code testing system 100 may also be used to provide flexibility in test scripts 126 generated by test script generating tool 110. In certain embodiments, a user provides one or more instructions to test script generating tool 110. Based on those instructions, test script generating tool 110, may determine a subset of the predetermined testing criteria for use in generating test script 126. For example, before generating test script 126 script engine 125 may prompt the user to choose which predetermined testing criteria to apply. The user may choose all, some, or none to apply. The user may determine that certain tests are redundant, unnecessary for the application of computer program 146 or would require too much time to run. In such cases, the use may unselect or otherwise indicate to exclude those tests. Once the subset is submitted, script engine 125 may generate test script 126 that reflects the user's input. As a result, test script generating tool 110 may provide flexibility in a user-friendly way by expanding user choice and influence in generating test script 126.

As discussed earlier, after test script 126 is generated by test script generating tool 110, test script 126 may be sent to test script repository 130. Test script repository 130 may include storage in which test script 126 may be stored. In certain embodiments, each of test scripts 126 received by test script repository 130 are associated with the specification document that provided visual inputs 106 to test script generating tool 110. For example, test script generating tool 110 may provide an indicator identifying the relevant specification document when transmitting a test script to test script repository 130. Test script repository 130 may store the indicator together with test script 126 so that the relevant test scripts may be accessed based on what specification document was used. For example, automation framework 140 may request in a script request 141, e.g., an access request, one or more test scripts from test script repository 130 to use to test a compiled computer program. Automation framework 140 may identify the specification document used in writing the compiled computer program in script request 141 to test script repository 130 for relevant test scripts. Test script repository 130 may use the provided identification to retrieve the relevant test scripts and send test script 126 to automation framework 140. In this manner, test script repository 130 may provide storage for test scripts generated by test script generating tool 110 to be used by automation framework 340 for testing compiled computer program code 146.

System 100 is described above as using automation framework 140 together with test script generating tool 110 to test computer program code 146. Automation framework 140 may include any automation framework that runs test scripts to test computer program code 146. For example, automation framework 140 may be configured to receive computer program code 146, e.g., from code repository 145, and run one or more test scripts against computer program code 146. In some embodiments, automation framework 140 is integrated with test script generating tool 110. For example, automation framework 140 and test script generating tool 110 may share hardware processing and/or memory resources and/or software resources. In this manner, automation framework ma be any suitable automation framework as understood by a person having ordinary skill in the art.

In certain embodiments, automation framework 140 may generate a report indicating any passed and/or failed tests completed using the one or more test scripts. The report may identify the location within computer code 146 of a failed test. The report may also identify what test was failed. In this manner, the developer may be provided feedback whether his code complied with the specification document. If the developer's code does not comply, e.g., it failed one or more tests carried out using test script 126, the report may provide information sufficient for the developer to fix the code so that it complies with the specification document. As a result, automation framework 140 may provide valuable feedback that can be used to develop more robust and compliant computer programs.

As discussed above, code repository server 145 may store computer programs, such as computer code 146, that have been developed and are ready for testing, e.g., via automation framework 140. For example, the developer may use specification document 105 to write computer program 146. The developer may compile computer program 146 and upload it to code repository server 145. Code repository server 145 may be accessed by automation framework 140 to retrieve compiled computer program 146 to be tested. In certain embodiments, code repository 145 sends script request 141 to automation framework 140 to test compiled computer program 146. In some embodiments, code repository 145 sends script request 141 as an automatic response to compiled computer program being uploaded to code repository 145. In some embodiments, the developer may indicate to code repository 145 to request automation framework to test the compiled computer program when uploading the compiled computer program to code repository 145. Upon the request, automation framework 140 may queue the compiled computer program for testing using the one or more of the generated tests scripts by test script generating tool 110. Code repository server 145 may be implemented in any suitable hardware/software combination. For example, code repository server 145 may include any suitable processors, memory, and interfaces as readily understood in the art. In this manner, code repository server 145 may be used to store relevant computer program code for testing in system 100.

In certain embodiments, code testing system 100 may further include optional machine learning training server 155. Machine learning training server 155 may be configured to train comparison algorithms or schemes used by identifier 120, such as the Bayesian comparison and the keyword-based sentimental classifier described herein. For example, a developer or compliance manager may input training cases to machine learning trainer server 155 that correspond to correct matches between textual objects 116 and known computer code elements 136. Using these input training cases, Machine learning training server 155 may adjust one or more comparison parameters 156 used in smart comparisons that may be used to match textual objects 116 and known elements 136. For example, the developer may provide a set of textual elements 116 that have been manually identified to correspond to certain known computer code elements 136 to Machine learning training server 155. Machine learning training server 155 may attempt to identify textual elements 116 using the existing comparison parameters 156. Machine learning training server 155 may then check to see if it arrived at the correct solution. If Machine learning training server 155 arrived at a different solution or did not arrive at any solution, Machine learning training server 155 may adjust one or more comparison parameters 156 based on the differences in the solutions and/or the correct solution. If Machine learning training server 155 provides the correct solution, it may reinforce the most relevant of comparison parameters 156. Machine learning training server 155 may perform these adjustment for the all of the test cases provided by the developer.

Once trained, the updated comparison parameters 156 may be used with the smart comparisons, such as the Bayesian comparison and the keyword-based sentimental classification. This allows for new known elements to be added to known objects 135 for use in identifying textual objects 116. Further it increases the accuracy for identifying a respective matching known object of the known objects 136. As a result, the resulting test scripts generated by test script generating tool 110 may improve over time and machine learning iterations, leading to improved testing and less buggy computer programs. In this manner, certain machine learning aspects may be integrated into test script generating tool 110 to improve its accuracy and reduce the amount of user input required to generate test scripts.

While only a brief discussion of machine learning is provided herein, it is understood to those having skill in the art that there are a multitude of machine learning training and reinforcement methods and systems that may be used with code testing system 100. Any suitable machine training apparatus or methods are contemplated for use in the various embodiments disclosed herein.

FIG. 2 illustrates example visual input 106a and textual objects 116a used in generating a test script, e.g., using test script generating tool 110. Visual input 106a and textual objects 116 illustrate non-limiting examples of visual input 106 and textual objects 116, but other suitable visual inputs 106 and textual objects 116 are contemplated herein. Visual input 106a may be visual input obtained from specification document 105 that includes user design interfaces. For example, visual input 106a may include elements that correspond to pictorial elements (e g., arrows, wireframe buttons, decision elements, etc.) and text elements (e.g., names, descriptors of elements, text describing functionality, yes/no forks, etc.). In the illustrated example, visual input 106a includes two display screens that are connected by an arrow. The left display screen is labeled "Home Screen" and includes two dashed boxes labeled "UserName" and "Password." respectively, and a solid-lined oval labeled "Submit." The right display screen is labeled "Dashboard" and includes two solid-lined boxes labeled "Customer Name" and "Account Balance," respectively and a solid-lined oval labeled "Contact Us." The arrow shows a direction from the left screen to the right screen. Visual input 106a may be one of the plurality of visual inputs 106 that is obtained by test script generating tool 110 and converted by conversion engine 115.

Conversion engine 115 may generate textual objects 116a based on visual data 205. As in this illustrated example, textual objects 116a may include a string of text that describe or represent visual input 106a. For example, the top one of textual objects 116a corresponds to the left screen "Home Screen" and the bottom on of textual objects 116a corresponds to the right screen "Dashboard." As provided in this example, textual objects 116a encode the functional information form the specification document displayed in visual input 106a in a text form. In particular, textual objects 116a encode the name of the screen as "PageName" and describe each element present on the screen. For example, the top one of textual objects 116a includes four elements, elements 1, 2, 3, and 4. Element 1 describes the "UserName" box by its name, the fact it is depicted by a dashed-lined box, and its dimensions. Element 2 describes the "Password" box by the same features. Element 3 describes the "Submit" button by its name, the fact it is, an oval button, and its dimensions. Lastly, Element 4 describes the fact there is an arrow between the screens and it extends from "Home Screen" to "Dashboard." The bottom one of textual objects 116a encodes similar information except for the different text descriptors used and the fact that the boxes are not dashed boxes, but solid-lined boxes. Accordingly, textual objects 116a encode visual input 106a for use by identifier tool 120 by providing a text-based form for describing the functional elements of the specification document that may be tested using a test script.

While FIG. 2 provides an example of the type of visual input 106a and textual objects 116a that may be used with test script generating tool 110, any suitable visual input and textual objects may be used in accordance with the disclosed techniques of generating a test script. For example, visual input 106a may take different forms based on specification document 105, e.g., based on the file type of specification document 105 or what methods are used to parse visual input 106a from specification document 105. As a specific example, scanned images from a printed version of specification document 105 may result in very different visual input 106a than from parsing a Visio specification document. Likewise textual objects 116a may differ based on the type of visual input 106a obtained by test script generating tool 110 and/or the implementation of identifier tool 120 and/or script engine 125. For example, different representations of textual objects 116a may be more useful (or compatible) with different programming languages and/or subroutines used by test script generating tool 110. In this manner, visual input 106a and textual objects 116a is not limited to the disclosed example embodiments, and may take any suitable form as understood by a person having skill in the art.

FIG. 3 is a flowchart of an embodiment of a test script generating method 300 for use in an automation framework. Test script generating tool 110 may employ method 300 for generating a test script based on visual inputs 106 from specification document 105.

At step 305, a plurality of visual inputs 100 is obtained from a computer program specification document 105. Each respective one of visual inputs 106 represents one or more functional requirements of specification document 105. For example, test script generating tool 110 may obtain visual inputs 106 from a server storing specification document 105.

At step 310, a plurality of textual objects 116 is generated from the plurality of visual inputs 106. For example, conversion engine 115 of test script generating tool 110 may convert a respective one of visual inputs 106 into one or more textual objects 116 that represent the respective one of visual inputs 106 and the underlying functional requirements from specification document 105. In this manner, textual objects 116 maintain an association with the requirements of specification document 105 but are more easily handled by identifier tool 120 and script engine 125 because they are textual objects instead of visual data.

At step 315, a set of known computer code elements 136 is accessed by test script generating tool 110. Each respective element of the set of known computer code elements 136 includes predetermined testing criteria for testing computer code that includes the respective element. For example, a respective one of known computer code elements 136 may include a page navigation button. The page navigation button may have predetermined testing criteria such as instructions to test the dimensions and color of the page navigation button or to test that the button is clickable and that it navigates to the correct page. The set of known computer code elements 136 may be stored in a separate repository or server or may be stored with test script generating tool 110. In some embodiments, the set of known computer code elements 136 may be updated and test script generating tool 110 may re-access the set of known code elements 136 to use the latest version.

Using the set of known computer code elements 136, at step 320, the plurality of textual objects is compared to determine whether any of textual objects 116 matches one or more of known elements 136. For example, a respective textual object of textual objects 116 generated from a respective visual input of visual inputs 106 corresponding to a textbox may match a known textbox element. The comparison may check if the textual object matches all of the characteristics of the respective one of known elements 136. In some embodiments, more advanced comparisons may be made. For example, machine learning trained algorithms employing a Bayesian comparison or a keyword classification analysis may be employed by identifier tool 120. In particular, a Bayesian comparison may be used to check if a respective one of textual objects 116 matches a known element even if the respective one textual object is not exactly the same as the respective one of known elements 136, e.g., is missing certain characteristics or the characteristics are slightly different. Also, the keyword classification may be used to check if the respective textual object matches one of known elements 136 using contextual text information from the respective visual input used to create the respective textual object.

Based on the comparison in step 320, at step 325, identifier tool 120 determines if the respective one of textual objects 116 matches one of known elements 136. If it does not match, method 300 may proceed to step 330, wherein additional information from another source is requested. For example, test script generating tool 110 may request input from user 150 to identify one of textual objects 116 and/or visual inputs 106 from which it was converted. As another example, test script generating tool 110 may request additional known elements. In such cases, method 300 may return to step 320 to further compare the respective textual object to the additional sets of known elements. In some embodiments, this process is repeated until a known element is matched with the respective textual object. In some embodiments, the respective textual object may not have a match to one of known elements 136.

If, on the other hand, the respective one of textual object matches a known computer code clement 136, method 300 may proceed to step 335, wherein testing criteria of the respective one of known elements 136 is associated with the respective textual object. For example, if the respective textual object matches with a display box, the respective textual object may be associated with testing criteria including testing for the height and width of the displayed box and testing for the content displayed in the displayed box. As a result, script engine 125 may know what tests to include in test script 126 for each of textual objects 116 based on the testing criteria associated with each respective one of textual objects 116.

In certain embodiments, steps 320, 325, 330, and/or 335 may be repeated for each textual object of textual objects 116 converted from visual inputs 106 obtained by script generating tool 110. In this manner, each of textual objects 116 may be analyzed to determine all appropriate testing criteria to include in test script 126 to be generated.

At step 340, a test script 126 is generated using the predetermined testing criteria associated with textual objects 116. For example, script engine 125 of test script generating tool 110 may receive identified objects 121 containing identified textual objects 116 and/or their associated testing criteria and parse the testing criteria into tests. The tests may be compiled into a script suitable for being ran by an automation tool such as automation framework 140. As a result, test script 126 may be generated by test script generating tool 110 using visual inputs 106 from specification document 105.

At step 345, test script 126 is transmitted to a test script repository server, such as test script repository sever 130. For example, after test script generating tool 110 generates test script 126 it may connect with a server on which test scripts are stored. The tests script generating tool 110 may also include identifying information with test script 126, separately or embedded in test script 126. For example, before transmission, test script generating tool 110 may associate test script 126 with the specification document 105 and/or identifying information from specification document 105. In certain embodiments, automation framework 140 may access test script 126 from test script repository server 130 for use in testing computer program 146 written based on specification document 105. As a result of method 300, test script 126 is generated and made accessible based on the plurality of visual inputs 106 is obtained from computer program specification document 105.

In certain embodiments, method 300 may include more or fewer steps and/or one or more substeps. For example, in certain embodiments, method 300 further includes receiving instructions from and/or data from a user. The received instructions and/or data may be used in determining which one of known elements 136 match respective ones of textual objects 116 and/or what testing criteria to include in the generated test script. Additionally, a user may instruct test script generating tool 110 to start or stop the generation of a test script. For example, a user may send a request to generate test script 126 based on specification document 105 that the user also specifies and provides access to. Accordingly, user input may be incorporated to ensure the accuracy of test script 126 and provide flexibility in what test script 126 tests.

While certain components of test script generating tool 110 are described as carrying out one or more steps of method 300, any suitable component of code testing system 100 may be used to carry out the various steps of the methods described herein.

FIG. 4 is a schematic diagram of an example test script generating tool 410 configured to generate test scripts using visual inputs, such as test script 126 from visual inputs 106. Test script generating tool 410 includes an interface 430, a memory 435, and a processor 440. Test script generating tool 410 may be configured in the illustrated configuration or in any other suitable configuration.

Interface 430 is configured to enable wired and/or wireless communications. Interface 430 is configured to communicate data between elements of code testing system 100, such as test script repository 130, known code elements repository 135, machine learning training server 155, and a server containing specification document 105, or between test script generating tool 410 and a remote system. For example, interface 430 may include a WIFI interface, a local area network (LAN) interface, a wide area network (WAN) interface, a modem, a switch, or a router. Processor 440 may be configured to send and receive data using the interface 430. Interface 430 may be configured to use any suitable type of communication protocol as would be appreciated by one of ordinary skill in the art.

Memory 435 comprises one or more disks, tape drives, or solid-state drives, and may be used as an over-flow data storage device, to store programs when such programs are selected for execution, and to store instructions and data that are read during program execution. Memory 435 may be volatile or non-volatile and may comprise, read-only memory (ROM), random-access memory (RAM), ternary content-addressable memory (TCAM), dynamic random-access memory (DRAM), and static random-access memory (SRAM). Memory 435 is operable to store instructions for converting visual inputs into textual objects, instructions for identifying textual objects and applying testing criteria, and instructions for generating a test script based on the testing criteria, and/or any other data, or instructions that may be used to carry out the functions and processing described herein. The instructions in memory 435 may include any suitable set of instructions, logic, rules, or code operable to execute conversion engine 415, identifier tool 420, and script engine 425. Additionally, memory 435 may be operable to store other information used or generated by conversion engine 415, identifier tool 420, or script engine 425. For example, memory 435 may be configured to store obtained visual inputs 106, textual objects 116 created by conversion engine 415, a set of known computer code elements 136 accessed from code elements repository 135, machine learning trained comparison parameters 156, the associations of testing criteria to textual objects 116, and the generated test script by script engine 425, e.g., test script 126.

Processor 440 comprises one or more processors operably coupled to the memory 435 and/or interface 430. Processor 440 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). Processor 440 may be a programmable logic device, a microcontroller, a microprocessor, or any suitable combination of the preceding. Processor 440 is communicatively coupled to and in signal communication with the memory 435 and/or interface 430. The one or more processors are configured to process data and may be implemented in hardware or software. For example, processor 440 may be 8-bit, 16-bit, 32-bit, 64-bit or of any other suitable architecture. Processor 440 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement conversion engine 415, identifier tool 420, and script engine 425. In this way, processor 440 may be a special purpose computer designed to implement function disclosed herein. In an embodiment, conversion engine 415, identifier tool 420, or script engine 425 are each implemented using logic units, FPGAs, ASICs, DSPs, or any other suitable hardware.

Conversion engine 415, identifier tool 420, or script engine 425 may implement the various feature of conversion engine 115, identifier tool 120, or script engine 125 as described in FIG. 1, respectively.

While not separate illustrated, each of test script repository 130, known elements server 135, automation framework 140, code repository server 145, and machine learning training server 155 may be implemented using any suitable computer hardware, software, or combination thereof. For example, each of test script repository 130, known elements server 135, automation framework 140, code repository server 145, and machine learning training server 155 may include one or more of a processor, a memory, and an interface, as described above in implementing the example test script generating tool 410. In certain embodiments, certain components of system 100 may be integrated together and/or share certain hardware and/or software resources. This disclosure includes any suitable configuration of the components and/or functionality described herein.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one, skilled in the art and could be made without departing from the spirit and scope disclosed herein.

To aid the Patent Office, and any readers of any patent issued on this application in interpreting the claims appended hereto, applicants note that they do not intend any of the appended claims to invoke 35U.S.C. § 112(f) as it exists on the date of filing hereof unless the words "means for" or "step for" are explicitly used in the particular claim.

The invention claimed is:

1. A test script generating tool for generating a test script for use in an automation framework, comprising:
   an interface communicatively coupling the test script generating tool to a server, wherein the test script generating tool accesses the server via the interface to obtain a plurality of visual inputs from a computer program specification document, wherein each visual input represents one or more functional requirements of the computer program specification document
   a memory storing the plurality of visual inputs and a set of known computer code elements, wherein each respective element of the set of known computer code elements comprises predetermined testing criteria for testing computer code that includes the respective element;
   a conversion engine configured to:
      access the plurality of visual inputs from the memory; and
      generate a plurality of textual objects from the plurality of visual inputs using one or more processors, wherein the plurality of textual objects is associated with the one or more functional requirements of the computer program specification document;
   an identifier tool configured to:
      access the set of known computer code elements from the memory;
      compare the plurality of textual objects to the set of known computer code elements to determine, for each respective textual object of the plurality of textual objects, whether the respective textual object matches a respective element of the set of known computer code elements; and
      if the respective textual object matches a respective element of the set of known computer code elements, associate the predetermined testing criteria of the respective element to the respective textual object; and
   a script engine configured to:
      generate a test script using the predetermined testing criteria associated with the plurality of the textual objects; and
      transmit the test script to a test script repository server, wherein the automation framework may access the lest script from the test script repository server.

2. The test script generating tool of claim 1, wherein the test script is generated and transmitted to the test script repository server prior to a compilation of a computer program written based on the computer program specification document.

3. The test script generating tool of claim 1, wherein:
   the predetermined testing criteria indicates to apply a style template;
   associating the predetermined testing criteria of the respective element to the respective textual object comprises:
      determining one or more user experience design requirements associated with the style template; and
      associating one or more style testing criteria to the textual object, wherein the one or more style testing criteria correspond to the one or more user experience design requirements associated with the style template; and
   the script engine generates the test script using at least the one or more style testing criteria associated with the respective textual object.

4. The test script generating tool of claim 1, wherein comparing the plurality of textual objects to the set of known computer code elements comprises applying a machine learning trained Bayesian comparison to the respective textual object against the set of known computer code elements to determine whether the respective textual object matches a respective element of the set of known computer code elements.

5. The test script generating tool of claim 1, wherein comparing the plurality of textual objects to the set of known computer code elements comprises applying a machine learning trained keyword-based classification to the respective textual object against the set of known computer code elements to determine whether the respective textual object matches a respective element of the set of known computer code elements.

6. The test script generating tool of claim 1, wherein:
   the test script generating tool is communicatively coupled to a user interface; and
   comparing the plurality of textual objects to the set of known computer code elements comprises:
      determining that the respective textual object does not match any element in the set of known computer code elements;
      prompting a user via the user interface for an identification of the textual object; and
      based on the identification, associating testing criteria to the respective textual object.

7. The test script generating tool of claim 1, wherein:
   the test script generating tool is communicatively coupled to a user interface enabling a user to provide one or more instructions to the test script generating tool; and
   the script engine generating the test script comprises determining a subset of the predetermined testing criteria for use in generating the test script based on the one or more instructions.

8. A method for generating a test script for use in automation framework, comprising:
   obtaining a plurality of visual inputs from a computer program specification document, wherein each visual input represents one or more functional requirements of the computer program specification document;
   generating a plurality of textual objects from the plurality of visual inputs, wherein the plurality of textual objects is associated with the one or more functional requirements of the computer program specification document;
   accessing a set of known computer code elements, wherein each respective element of the set of known computer code elements comprises predetermined testing criteria for testing computer code that includes the respective elements;
   comparing the plurality of textual objects to the set of known computer code elements to determine, for each respective textual object of the plurality of textual objects, whether the respective textual object matches a respective element of the set of known computer code elements;

if the respective textual objet matches a respective element of the set of known computer code elements, associating the predetermined testing criteria of the respective element to the respective textual object;

generating a test script using the predetermined testing criteria associated with the plurality of the textual objects; and transmitting the test script to a test script repository server, wherein the automation framework may access the test script from the test script repository server.

9. The method of claim 8, wherein generating the test script and transmitting the test script occur prior to a compilation of a computer program written based an the computer program specification document.

10. The method of claim 8, wherein:
the predetermined testing criteria indicates to apply a style template;
associating the predetermined testing criteria of the respective element to the respective textual object comprises:
determining one or more user experience design requirements associated with the style template; and
associating one or more style testing criteria to the textual object, wherein the one or more style testing criteria correspond to-the one or more user experience design requirements associated with the style template; and
generating the test script comprises using at least the one or more style testing criteria associated with the respective textual object.

11. The method of claim 8, wherein comparing the plurality of textual objects to the set of known computer code elements comprises applying a machine learning trained Bayesian comparison to the respective textual object against the set of known computer code elements to determine whether the respective textual object matches a respective element of the set of known computer code elements.

12. The method of claim 8, wherein comparing the plurality of textual objects to the set of known computer code elements comprises applying a machine learning trained keyword-based classification to the respective textual object against the set of known computer code elements to determine whether the respective textual object matches a respective element of the set of known computer code elements.

13. The method of claim 8, wherein comparing the plurality of textual objects to the set of known computer code elements comprises:
determining that the respective textual object does not match any element in the set of known computer code elements;
prompting a user via a user interface for an identification of the textual object; and
based on the identification, associate predetermined testing criteria to the respective textual object.

14. The method of claim 8, further comprising receiving one or more instructions from a user via a user interface;
wherein generating the test script comprises determining, based on the one or more instructions, a subset of the predetermined testing criteria for use in generating the test script.

15. A system for testing computer code, comprising:
an automation framework configured to run test scripts to test computer code programs;
a test script generating tool for generating a test script for use in the automation framework;
a test script repository server communicatively coupled to the test script generating tool, wherein the test script repository comprises a memory for storing the test script generated by the test script generating tool; and
a computer code repository server communicatively coupled to the test automation framework, wherein the computer code repository comprises a memory for storing a compiled computer code;
wherein the test script generating tool comprises:
an interface communicatively coupling the test script generating tool to a server, wherein the test script generating tool accesses the server via the interface to obtain a plurality of visual inputs from a computer program specification document, wherein each visual input represents one or more functional requirements of the computer program specification document
a memory storing the plurality of visual inputs and a set of known computer code elements, wherein each respective element of the set of known computer code elements comprises predetermined testing criteria for testing computer code that includes the respective element;
a conversion engine configured to:
access the plurality of visual inputs from the memory; and
generate a plurality of textual objects from the plurality of visual inputs using one or more processors, wherein the plurality of textual objects is associated with the one or more functional requirements of the computer program specification document;
an identifier tool configured to:
access the set of known computer code elements from the memory;
compare the plurality of textual objects to the set of known computer code elements to determine, for each respective textual object of the plurality of textual objects, whether the respective textual of matches a respective element of the set of known computer code elements; and
if the respective textual object matches a respective element of the set of known computer code elements, associate the predetermined testing criteria of the respective element to the respective textual object; and
a script engine configured to:
generate a test script using the predetermined testing criteria associated with the plurality of the textual objects; and
transmit the test script to the test script repository server, wherein the automation framework may access the test script from the test script repository server; and
wherein the automation framework is configured to:
access the test script from the test script repository server and access the compiled computer program from the computer code repository server; and
run the test script on the compiled computer program.

16. The system for testing computer code of claim 15, further comprising a machine learning training server communicatively coupled to the test script generating tool, wherein the test script generating tool comparing the plurality of textual objects to the set of known computer code elements comprises applying a machine learning trained comparison trained by the machine learning training server.

17. The system for testing computer code of claim 15, wherein:
the test the test script generating tool is communicatively coupled to a user interface; and
comparing the plurality of textual objects to the set of known computer code elements comprises:
determining that the respective textual object does not match any element in the set of known computer code elements;
prompting a user via the user interface for an identification of the textual object; and
based on the identification, associating testing criteria to the respective textual object.

18. The system for testing computer code of claim 15, wherein:
the test script generating tool is communicatively coupled to a user interface enabling a user to provide one or more instructions to the test script generating tool; and
the script engine generating the test script comprises determining a subset of the predetermined testing criteria for use in generating the test script based on the one or more instructions.

19. The system for testing computer code of claim 15, wherein the automation framework is configured to automatically access the compiled computer program from the computer code repository server in response to receiving a notification from the computer code repository server that the compiled computer program has been uploaded to the computer code repository server.

20. The system for testing computer code of claim 15, wherein the automation framework is configured to automatically access the test script from the test script repository server by sending an access request to the test script repository server, wherein the access request is used to identify the test script associated with the compiled computer program.

* * * * *